(12) United States Patent
Georgeson et al.

(10) Patent No.: US 11,624,690 B2
(45) Date of Patent: Apr. 11, 2023

(54) DEVICE AND METHOD FOR USE IN EXAMINING A COMPOSITE STRUCTURE

(71) Applicant: The Boeing Company, Chicago, IL (US)

(72) Inventors: Gary E. Georgeson, Tacoma, WA (US); Gregory James Sweers, Renton, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 16/351,066

(22) Filed: Mar. 12, 2019

(65) Prior Publication Data
US 2020/0292430 A1 Sep. 17, 2020

(51) Int. Cl.
*G01N 3/34* (2006.01)
(52) U.S. Cl.
CPC ....... *G01N 3/34* (2013.01); *G01N 2203/0062* (2013.01); *G01N 2203/0091* (2013.01)
(58) Field of Classification Search
CPC ............ G01N 3/34; G01N 2203/0091; G01N 2203/0062; G01N 29/00; G01N 2203/0005; G01N 2203/0658
See application file for complete search history.

(56) References Cited

U.S. PATENT DOCUMENTS

| | | | | |
|---|---|---|---|---|
| 5,679,899 | A * | 10/1997 | Webster | G01H 9/002 356/35.5 |
| 6,748,791 | B1 * | 6/2004 | Georgeson | G01M 7/08 73/12.01 |
| 2008/0109187 | A1 * | 5/2008 | Kollgaard | G06F 11/2294 702/188 |
| 2008/0156096 | A1 * | 7/2008 | Kollgaard | G01N 29/4436 73/577 |
| 2014/0118530 | A1 * | 5/2014 | Holmes | G01N 29/22 348/92 |
| 2017/0074830 | A1 * | 3/2017 | Bellotti | G01N 29/11 |
| 2017/0108855 | A1 * | 4/2017 | Hocker | G01N 3/42 |
| 2017/0234837 | A1 * | 8/2017 | Hall | G01N 29/2431 73/602 |
| 2019/0391059 | A1 * | 12/2019 | Miyake | G01N 3/34 |

* cited by examiner

*Primary Examiner* — Peter J Macchiarolo
(74) *Attorney, Agent, or Firm* — Armstrong Teasdale LLP (57) ABSTRACT

A method of performing an automated non-destructive examination of a composite structure includes identifying surface damage on the composite structure, coupling an automated tap tester device to a surface of the composite structure at a location of the surface damage, and performing, with the automated tap tester device, a plurality of tapping impacts on the surface within a testing area that encapsulates the surface damage. The method also includes receiving a plurality of acoustic signals associated with the plurality of tapping impacts, modeling sub-surface damage associated with the surface damage based on an analysis of the plurality of acoustic signals.

20 Claims, 7 Drawing Sheets

DEVICE AND METHOD FOR USE IN EXAMINING A COMPOSITE STRUCTURE

FIELD

The field relates generally to non-destructive examination techniques and, more specifically, to automated non-destructive examination of composite structures.

BACKGROUND

Common multi-layer laminate structures fabricated from carbon-fiber-reinforced polymer (CFRP), fiberglass, and the like may be susceptible to damage, such as the formation of micro-cracks and delamination of the structure during service and/or manufacturing thereof. Known damage to such structures may extend into sub-surface regions of the structures, thereby making it difficult to detect, and to determine its size via general visual inspection, during scheduled maintenance. Thus, at least one known method of inspecting potentially damaged composite structures is non-destructive examination. A known non-destructive examination technique is the tap hammer method, which includes striking the structure with a tool and listening for a change in the sound from each strike. The sound produced by striking a damaged region of the structure differs from the sound produced by a non-damaged region. However, the tap hammer method requires continuous technician intervention, and the accuracy of the results is dependent on human subjectivity. In addition, it may be difficult, hard to reach, or unsafe for the technician to inspect certain areas of a structure.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a method of performing a non-destructive examination of a composite structure includes identifying surface damage on the composite structure, coupling an automated tap tester device to a surface of the composite structure at a location of the surface damage, and performing, with the automated tap tester device, a plurality of tapping impacts on the surface within a testing area that encapsulates the surface damage. The method also includes receiving a plurality of acoustic signals associated with the plurality of tapping impacts, modeling sub-surface damage associated with the surface damage based on an analysis of the plurality of acoustic signals.

In another aspect, an automated tap tester device for use in examining a composite structure includes a frame including a base having an opening that defines a field of operation, a linear stage coupled to the base, and a tapping member coupled to the linear stage. The tapping member is configured to perform a plurality of tapping impacts on a surface of the composite structure, wherein the linear stage is movable relative to the base and the tapping member is movable relative to the linear stage to enable the tapping member to traverse the field of operation. The device also includes a sensor configured to receive a plurality of acoustic signals associated with the plurality of tapping impacts.

In yet another aspect, a method of examining a composite structure includes receiving tapping impact data associated with performance of a plurality of tapping impacts on a surface of the composite structure, wherein the plurality of tapping impacts are performed within a testing area that encapsulates surface damage on the composite structure, and wherein the tapping impact data is based on a plurality of acoustic signals associated with the plurality of tapping impacts. The method also includes modeling sub-surface damage associated with the surface damage based on an analysis of the tapping impact data, and generating a model of the sub-surface damage.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The embodiments described herein relate to automated non-destructive examination of composite structures. In the example embodiment, an automated tap tester device is used to examine a composite structure. The device includes a tapping member capable of performing a plurality of tapping impacts on a surface of the composite structure, and a sensor for receiving a plurality of acoustic signals associated with the tapping impacts. The device may be attached to the composite structure using an automated or remote-controlled vehicle (e.g., a crawler, robotic arm, or unmanned automated vehicle). As such, the device is positionable at locations of potential surface damage on the composite structure that may be difficult to reach, or potentially unsafe to access by a technician. Once attached to the composite structure, the device performs an automated examination of the composite structure. For example, the device performs a series of tapping impacts on the composite structure across the location of potential surface damage, and stores and/or transmits data associated with acoustic signals produced by the tapping impacts. The data may be used to identify and model sub-surface damage associated with the potential surface damage. As such, the systems and methods described herein facilitate performing non-destructive examination of composite structures in a safe, rapid, and objective manner that enables damage to be accurately modeled.

Figure 1:
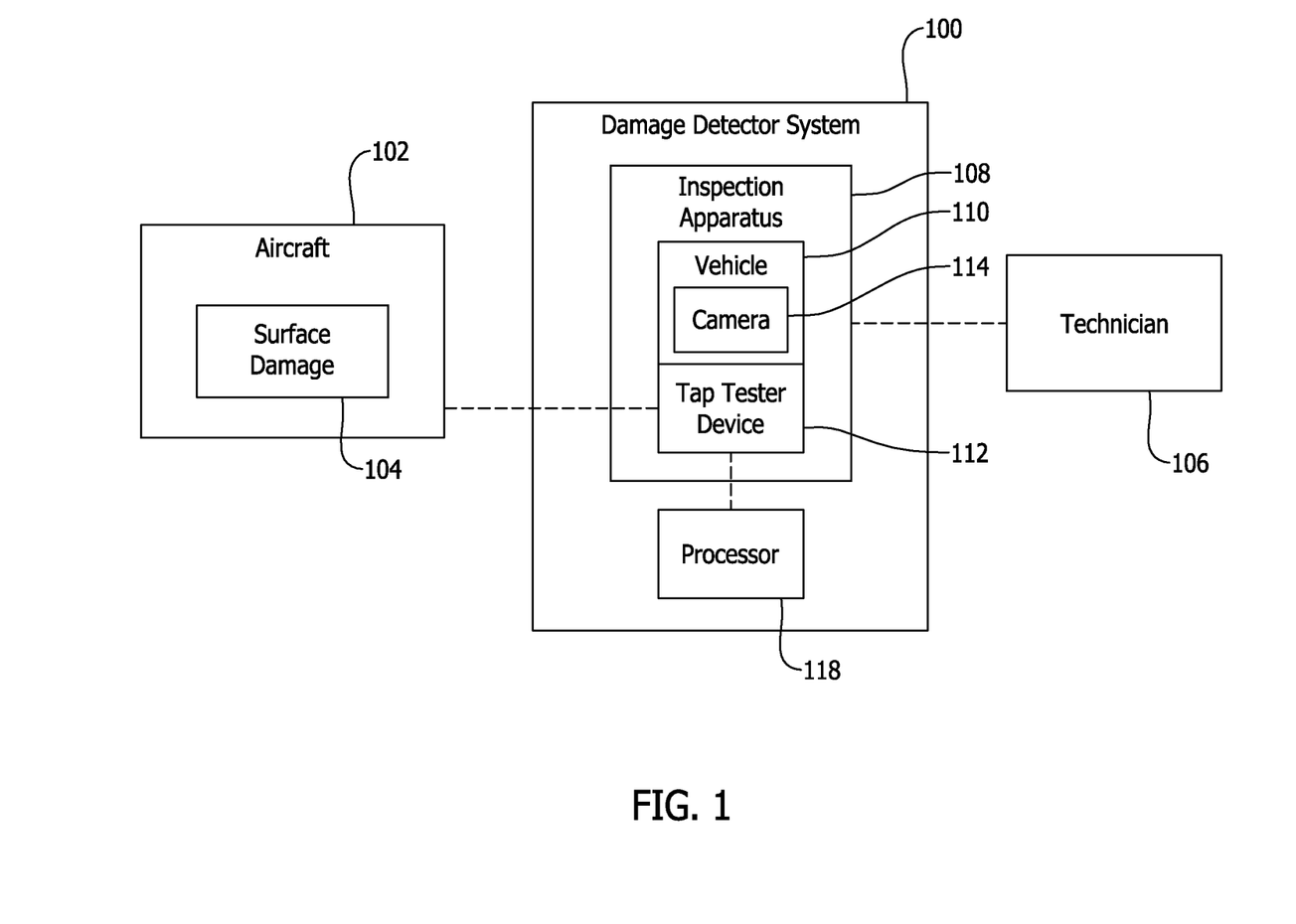
FIG. 1 is a block diagram illustrating an example damage detector system.

FIG. 1 is a block diagram illustrating an example damage detector system 100. In the example embodiment, damage detector system 100 is used to perform an examination of an aircraft 102 having potential surface damage 104 located thereon. Surface damage 104 may be embodied as a mark, a small indent, a lightning strike, or a location of known impact on aircraft 102. Surface damage 104 may be may be difficult to reach, or potentially unsafe to access by a technician, such as at a location on aircraft 102 that is greater than a predetermined height from ground level. The location of known impact may be from an inadvertent strike, such as from a piece of luggage during loading and unloading of aircraft 102, or from a tool during scheduled maintenance of aircraft 102. Surface damage 104 may be identified manually by a technician 106, or with a device or tool that includes a camera and is capable of providing visual feedback to technician 106.

For example, damage detector system 100 includes an inspection apparatus 108 including a vehicle 110 and a tap tester device 112 selectively coupled to vehicle 110. Vehicle 110 may be any automated or remote-controlled device that enables damage detector system 100 to function as described herein. For example, vehicle 110 may be an unmanned vehicle that is capable of flight, or that is capable of traversing the surface of aircraft 102. In one embodiment, vehicle 110 is controlled by technician 106 to facilitate performance of an inspection operation on aircraft 102. For example, in the example embodiment, vehicle 110 includes a camera 114, and technician 106 controls vehicle 110 to inspect the surface of aircraft 102 with camera 114 to identify potential surface damage 104.

Once surface damage 104 on aircraft 102 is identified, vehicle 110 is used to transport tap tester device 112 for coupling to a composite structure 116 (shown in FIG. 2) at the location of surface damage 104. In an alternative embodiment, technician 106 may manually couple tap tester device 112 to composite structure 116, such as with a pole, an extensible tool, or the like. Tap tester device 112 may be any automated or remote-controlled device that enables damage detector system 100 to function as described herein. For example, as will be described in more detail below, tap tester device 112 is operable to perform an examination of aircraft 102 in an autonomous or semi-autonomous manner. For example, in the example embodiment, technician 106 commands tap tester device 112 to initiate an examination operation, which is pre-programmed for execution by tap tester device 112. The examination operation generates testing data (i.e., tapping impact data), which is received by a processor 118 for further analysis. Processor 118 may be included on tap tester device 112, or may be coupled in communication with tap tester device 112 and located remotely therefrom. Processor 118 analyzes the testing data to facilitate modeling damage on aircraft 102, as will be described in more detail below. Although described in the context of an aircraft, it should be understood that damage detector system 100 may be used to inspect any type of vehicle or structure.

Figure 2:
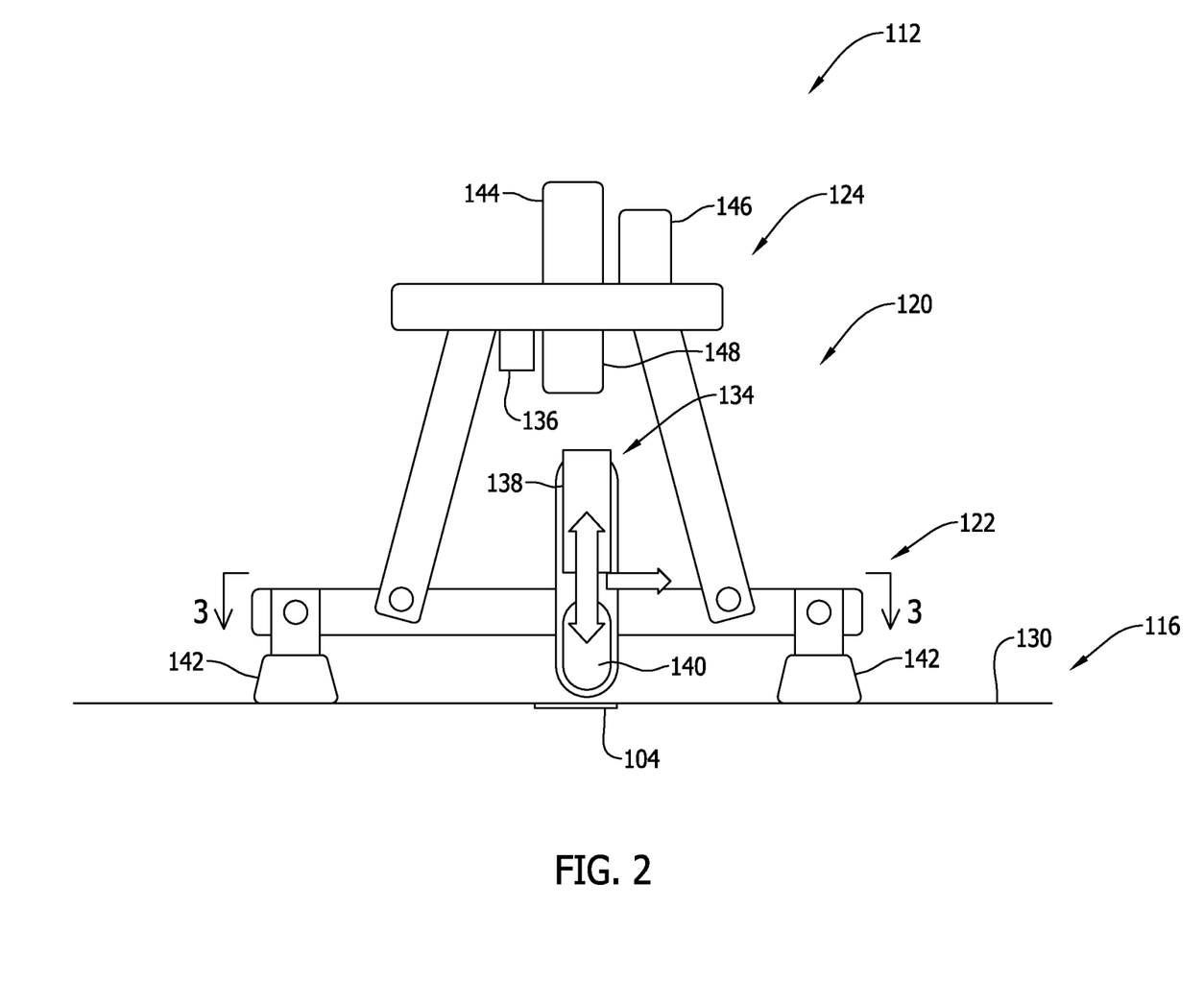
FIG. 2 is a side view illustration of an example tap tester device that may be used in the damage detector system shown in FIG. 1.
Figure 3:
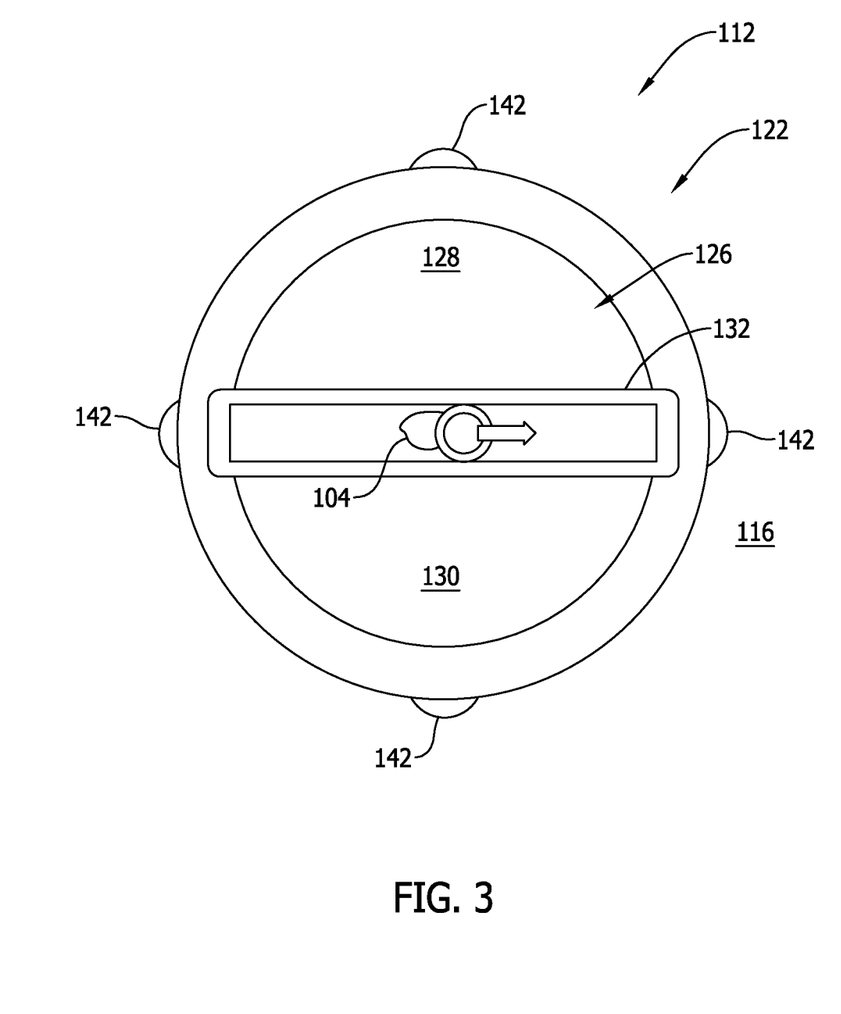
FIG. 3 is an illustration of the tap tester device shown in FIG. 2 taken along line 3-3.

FIG. 2 is a side view illustration of an example tap tester device 112, and FIG. 3 is an illustration of tap tester device 112 taken along line 3-3 (shown in FIG. 2). In the example embodiment, tap tester device 112 includes a frame 120 including a base 122 and a bracket 124 coupled to base 122. Base 122 includes an opening 126 that defines a field of operation 128 for tap tester device 112. As noted above, tap tester device 112 may be coupled to a surface 130 of composite structure 116 at a location of surface damage 104. For example, tap tester device 112 is oriented on surface 130 such that surface damage 104 is encapsulated within field of operation 128. In addition, base 122 is sized such that field of operation 128 extends across a greater surface area of surface 130 than surface damage 104. As such, tap tester device 112 evaluates the sub-structure of composite structure 116 for sub-surface damage that may have expanded past the bounds of surface damage 104.

In the example embodiment, tap tester device 112 also includes a linear stage 132 coupled to base 122, and a tapping member 134 coupled to linear stage 132. In operation, tapping member 134 translates vertically relative to surface 130 in a repetitive motion to perform a plurality of tapping impacts on surface 130. For example, tapping member 134 may be a solenoid-based tapper mechanism, a bondtester, or a mechanical impedance analysis probe. In addition, linear stage 132 is movable relative to base 122, and tapping member 134 is movable relative to linear stage 132 such that tapping member 134 traverses the whole field of operation 128. A plurality of acoustic signals are generated as a result of the tapping impacts. As such, tap tester device 112 includes a sensor 136 for receiving the acoustic signals associated with the tapping impacts. Acoustic signal data may then be stored and/or transferred to processor 118 (shown in FIG. 1) for further analysis.

In one embodiment, a linear encoder 138 and an accelerometer 140 are coupled to tapping member 134. Linear encoder 138 is operable to track a position of tapping member 134 during the performance of an examination within field of operation 128. In addition, linear stage 132 has circumferential encoding as it rotates relative to base 122 to facilitate tracking a position of tapping member 134. The position data may be correlated with the acoustic signal data to facilitate modeling damage on composite structure 116. In addition, accelerometer 140 facilitates measuring impact time for each tapping impact. The impact time may be correlated to a local stiffness of surface 130. For example, a greater impact time is correlated to a lower local stiffness, and vice versa, and a lower local stiffness is indicative of the presence of sub-surface damage within composite structure 116. Thus, the local stiffness data may be correlated with the position data and then used in combination with the acoustic signal data to more accurately model damage on composite structure 116.

In the example embodiment, tap tester device 112 also includes a mounting system 142 and a connector 144. Mounting system 142 is coupled to frame 120 and facilitates selective coupling of tap tester device 112 to surface 130 of composite structure 116. For example, mounting system 142 may facilitate the selective engagement using suction cups, adhesives, magnetic attachment, electrostatic attachment, or any other attachment mechanism that enables tap tester device 112 to be coupled and uncoupled from surface 130 with relative ease. Alternatively, tap tester device 112 may be held on composite structure 116 with pressure applied by vehicle 110. In addition, connector 144 is designed to provide selective engagement with vehicle 110 (shown in FIG. 1). As such, in operation, vehicle 110 is coupled to tap tester device 112 at connector 144, and transports tap tester device 112 to a location of surface damage 104. Once tap tester device 112 is coupled to surface 130, vehicle 110 releases connector 144 and tap tester device 112 performs the examination operation. Vehicle 110 may then re-engage connector 144 to facilitate uncoupling tap tester device 112 from surface 130 when the examination operation is complete.

Tap tester device 112 also includes a camera 148 and a power supply 146. In one embodiment, camera 148 may be used to visually inspect surface 130 of composite structure 116 for surface damage 104. For example, camera 148 may be used as an alternative to, or in conjunction with, camera 114 (shown in FIG. 1) to visually inspect surface 130 of composite structure 116. Either camera 114 or 148 may include, or be used in conjunction with, damage verification software. The damage verification software uses machine learning to characterize the difference between actual damage and false positive damage (e.g., grease smudges or dirt) on composite structure 116. Camera 148 is also operable for providing visual feedback to technician 106 (shown in FIG. 1) as he/she guides vehicle 110 towards surface damage 104. Thus, camera 148 enables tap tester device 112 to be centered over the location of surface damage 104. In addition, power supply 146 enables tap tester device 112 to operate either autonomously or semi-autonomously, and enables tap tester device 112 to be positioned at difficult to reach locations on aircraft 102.

Figure 4:
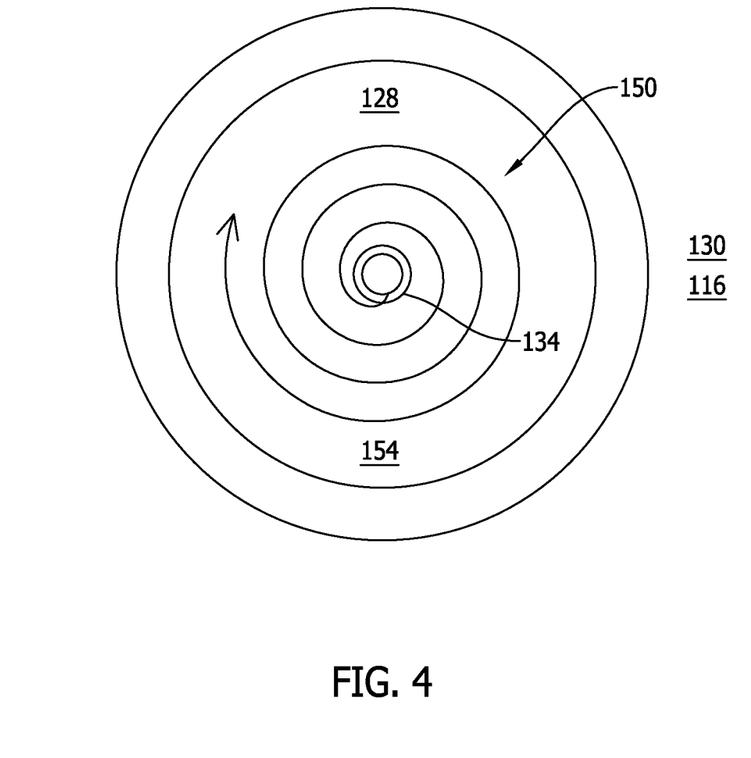
FIG. 4 illustrates an example impact path that may be performed by the tap tester device shown in FIG. 3.
Figure 5:
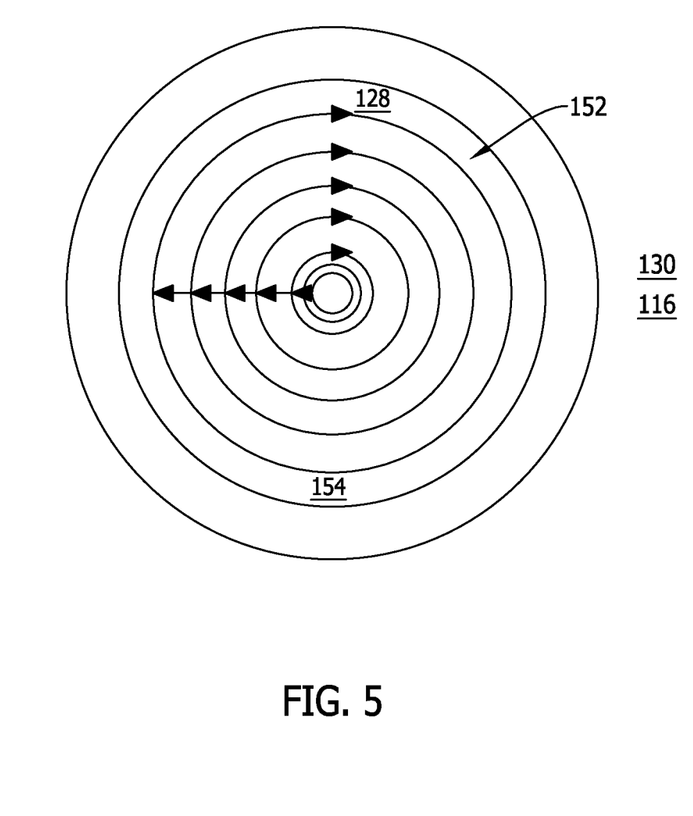
FIG. 5 illustrates an alternative impact path that may be performed by the tap tester device shown in FIG. 3.

FIG. 4 illustrates an example impact path 150 that may be performed by tap tester device 112 (shown in FIG. 3), and FIG. 5 illustrates an alternative impact path 152 that may be performed by tap tester device 112. In the example embodiment, field of operation 128 defines a testing area 154 on surface 130 of composite structure 116. In one embodiment, tapping member 134 performs the plurality tapping impacts in a predetermined impact path across testing area 154. Any predetermined impact path may be performed that facilitates traversing the whole testing area 154. For example, referring to FIG. 4, tapping member 134 performs impact path 150 that extends helically across testing area 154. Referring to FIG. 5, tapping member 134 performs impact path 152 defined by a plurality of circles extending about surface damage 104 (shown in FIG. 3), with each successive circle increasing in radial size relative to surface damage 104. As such, the predetermined impact path is selected to ensure the whole testing area 154 is evaluated.

Alternatively, tapping member 134 may initially perform tapping impacts in a predetermined impact path, and the impact path may be adjusted based on feedback received during performance of the examination operation. For example, in one embodiment the impact path is adjusted based on an iterative analysis of each acoustic signal received after performance of the tapping impacts. In the example embodiment, the plurality of acoustic signals received by sensor 136 (shown in FIG. 2) have a first signature or a second signature that is different than the first signature. The first and second signatures are defined based on differences in at least one of the frequency or amplitude of the acoustic signals, with the first signature being associated with a non-damaged area of composite structure 116 and the second signature being associated with a damaged area of composite structure 116. The first signature has a baseline frequency and amplitude that is determined based on an analysis of a portion of composite structure 116 known to be undamaged. As such, in the alternative embodiment, the impact path is adjusted to cover less than the whole testing area 154 based on an analysis of the signal signatures and a determination that the outer bounds of sub-surface damage (shown in FIGS. 6 and 7) have been reached.

Figure 6:
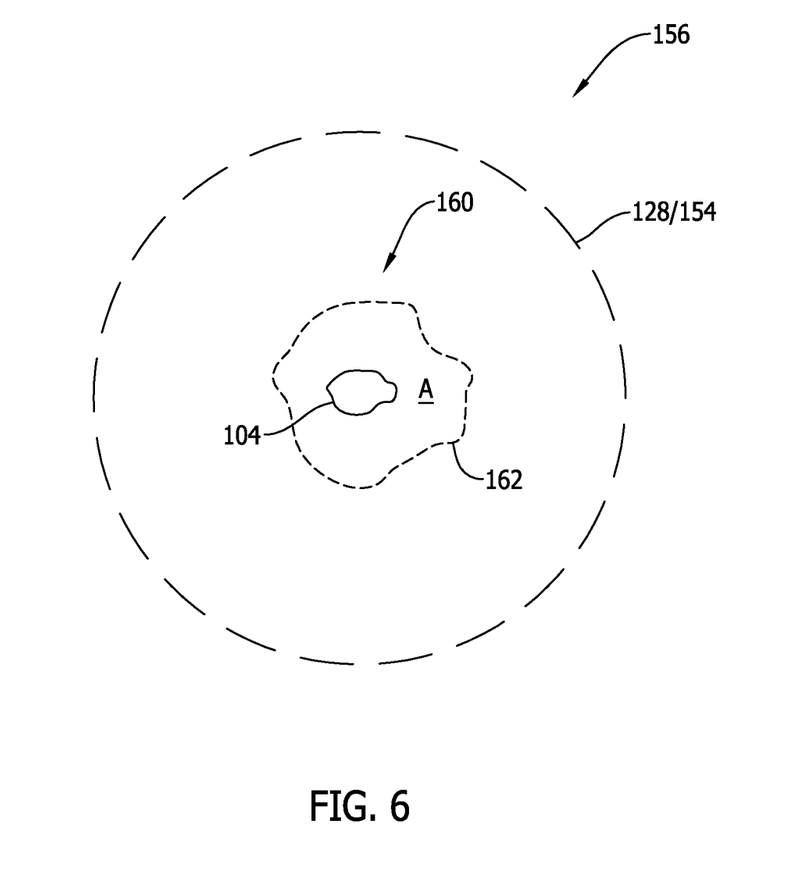
FIG. 6 illustrates an example first model that may be generated by the damage detector system shown in FIG. 1.
Figure 7:
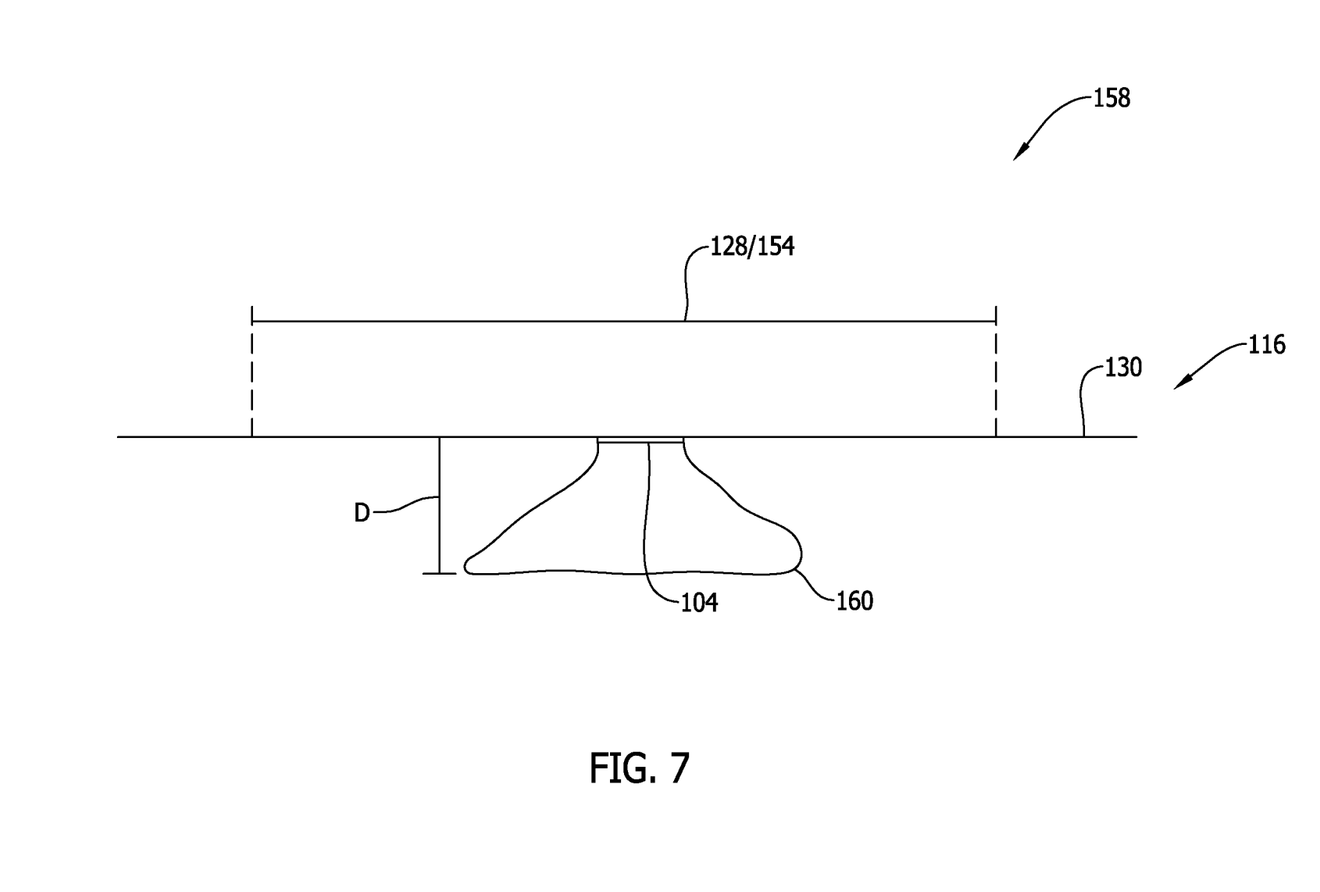
FIG. 7 illustrates an example second model that may be generated by the damage detector system shown in FIG. 1, the second model illustrating hidden damage that can be characterized by extent using the method described herein.

FIG. 6 illustrates an example first model 156 that may be generated by damage detector system 100 (shown in FIG. 1), and FIG. 7 illustrates an example second model 158 that may be generated by damage detector system 100. In the example embodiment, sub-surface damage 160 is formed within composite structure 116 as a result of surface damage 104. Sub-surface damage 160 is defined by delamination between plies (not shown) of, or by crack propagation within, composite structure 116, for example. Second model 158 illustrates hidden damage that can be characterized by extent using the method described herein.

In the example embodiment, sub-surface damage 160 is modeled based on an analysis of the plurality of acoustic signals received during performance of the examination operation. For example, modeling of sub-surface damage 160 includes determining a surface area A of sub-surface damage 160 relative to surface 130, and determining a depth D of sub-surface damage 160 relative to surface 130. As noted above, position data obtained during performance of an examination operation may be correlated with acoustic signal data to facilitate modeling damage on composite structure 116. More specifically, an analysis is performed to determine the locations from which acoustic signals having either the first signature or the second signature were received across testing area 154. The boundary 162 of sub-surface damage 160 may be determined by mapping the locations from which acoustic signals having the first signature were received, and the locations from which acoustic signals having the second signature were received. In addition, the local stiffness data obtained by accelerometer 140 (shown in FIG. 2) may be correlated with the position data and then used in combination with the acoustic signal data to more accurately identify boundary 162. As such, boundary 162 of sub-surface damage 160 may be used to determine surface area A.

In addition, an analysis of at least one of a frequency and an amplitude of the acoustic signals enables depth D of sub-surface damage 160 to be determined. For example, as depth D of sub-surface damage increases, the frequency of the acoustic signal is higher than the baseline frequency, and the amplitude of the acoustic signal is lower than the baseline amplitude. The greater the difference in the frequency and the amplitude from the baseline values, the greater the depth D of sub-surface damage 160. Thus, the position data may be correlated with the frequency and amplitude data to facilitate mapping depth D.

First model 156 and second model 158 may be provided to technician 106 (shown in FIG. 1), or another qualified individual, to evaluate the extent of sub-surface damage 160. The evaluation is used to determine whether sub-surface damage 160 is non-existent, is below a threshold, needs a temporary repair, or needs a permanent repair. Technician 106 is capable of providing a repair recommendation based on the modeling of sub-surface damage 160 and based on the evaluation.

Example embodiments of an automated tap tester device and related methods of non-destructive examination are described above in detail. Aspects of the device and methods are not limited to the specific embodiments described herein, but rather, components of the device may be used independently and separately from other components described herein. For example, aspects of the automated tap tester device may be included in any examination tool where modeling sub-surface damage on a composite structure in an efficient, objective, and safe manner is desired.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method of performing a non-destructive examination of a composite structure, the method comprising:
    identifying surface damage on the composite structure;
    coupling an automated tap tester device to a surface of the composite structure at a location of the surface damage, wherein an opening in the automated tap tester device defines a field of operation, the automated tap tester device oriented to position the field of operation over the surface damage;
    performing, with a tapping member of the automated tap tester device, a plurality of tapping impacts on the surface within a testing area defined by the field of operation, wherein the tapping member is movable in three dimensions to traverse the field of operation and perform at least one tapping impact at each of a plurality of testing locations within the testing area; and wherein performing a plurality of tapping impacts comprises:
        performing the plurality of tapping impacts across the testing area; and
        adjusting an impact path defined by the plurality of tapping impacts based on an iterative analysis of each acoustic signal received after performance of the plurality of tapping impacts;
    receiving a plurality of acoustic signals associated with the plurality of tapping impacts, wherein at least one acoustic signal is associated with each respective testing location; and
    modeling sub-surface damage associated with the surface damage based on an analysis of the plurality of acoustic signals.

2. The method in accordance with claim 1, wherein receiving a plurality of acoustic signals comprises:
    receiving a plurality of first acoustic signals having a first signature, wherein the first signature is associated with a non-damaged area of the composite structure; and
    receiving a plurality of second acoustic signals having a second signature different than the first signature, wherein the second signature is associated with a damaged area of the composite structure.

3. The method in accordance with claim 2, wherein modeling sub-surface damage comprises:
    determining a surface area of the sub-surface damage relative to the surface based on an analysis of locations from which the first and second acoustic signals were received across the testing area; and
    determining a depth of the sub-surface damage relative to the surface based on an analysis of at least one of a frequency and an amplitude of the first and second acoustic signals.

4. The method in accordance with claim 1, wherein performing a plurality of tapping impacts comprises performing the plurality of tapping impacts in a predetermined impact path across the testing area.

5. The method in accordance with claim 1, wherein performing a plurality of tapping impacts comprises:
    determining, with an accelerometer, a stiffness of the surface of the composite structure across the testing area; and
    modeling the sub-surface damage based on an analysis of the stiffness of the surface at different locations across the testing area.

6. The method in accordance with claim 1, wherein coupling an automated tap tester device comprises coupling the automated tap tester device to the surface using a vehicle that is automated or remote-controlled.

7. The method in accordance with claim 6, wherein coupling the automated tap tester device comprises using a camera to align the automated tap tester device and the vehicle with the location of the surface damage.

8. A method of examining a composite structure, the method comprising:
    performing a plurality of tapping impacts including:
        performing the plurality of tapping impacts across a testing area on surface of the composite structure; and
        adjusting an impact path defined by the plurality of tapping impacts based on an iterative analysis of each acoustic signal received after performance of the plurality of tapping impacts;
    receiving tapping impact data associated with the plurality of tapping impacts on the surface of the composite structure, wherein the plurality of tapping impacts are performed at each of a plurality of testing locations within a testing area that encapsulates surface damage on the composite structure, and wherein the tapping impact data is based on a plurality of acoustic signals associated with the plurality of tapping impacts, wherein at least one acoustic signal is associated with each respective testing location;
    modeling sub-surface damage associated with the surface damage based on an analysis of the tapping impact data; and
    generating a model of the sub-surface damage.

9. The method in accordance with claim 8, wherein receiving tapping impact data comprises:
    identifying the surface damage on the composite structure;
    coupling an automated tap tester device to the surface of the composite structure at a location of the surface damage;
    performing, with the automated tap tester device, the plurality of tapping impacts on the surface; and
    receiving the plurality of acoustic signals associated with the plurality of tapping impacts.

10. The method in accordance with claim 8, wherein generating a model comprises:
    generating a first model of a surface area defined by the sub-surface damage; and
    generating a second model of a sub-surface depth defined by the sub-surface damage.

11. The method in accordance with claim 8, wherein modeling the sub-surface damage comprises determining a surface area and a depth of the sub-surface damage based on at least one of a frequency and an amplitude of the plurality of acoustic signals.

12. The method in accordance with claim 11 further comprising providing a repair recommendation based on the modeling of the sub-surface damage.

13. The method in accordance with claim 8 further comprising providing a repair recommendation based on the modeling of the sub-surface damage.

14. A method of performing a non-destructive examination of a composite structure, the method comprising:
identifying surface damage on the composite structure;
coupling an automated tap tester device to a surface of the composite structure at a location of the surface damage, wherein an opening in the automated tap tester device defines a field of operation, the automated tap tester device oriented to position the field of operation over the surface damage;
performing tapping impacts on the surface within a testing area defined by the field of operation, wherein the tapping member is movable in three dimensions to traverse the field of operation and perform at least one tapping impact at separate testing locations within the testing area; and wherein performing tapping impacts comprises:
performing the tapping impacts across the testing area; and
adjusting an impact path defined by the tapping impacts based on an iterative analysis of each acoustic signal received after performance of the tapping impacts;
receiving acoustic signals associated with the tapping impacts, wherein an acoustic signal is associated with each respective testing location; and
generating a first model of sub-surface damage including delamination associated with the surface damage based on an analysis of the acoustic signals; and
generating a second model illustrating hidden damage.

15. The method in accordance with claim 14, wherein receiving acoustic signals comprises:
receiving first acoustic signals having a first signature, wherein the first signature is associated with a non-damaged area of the composite structure; and
receiving second acoustic signals having a second signature different than the first signature, wherein the second signature is associated with a damaged area of the composite structure.

16. The method in accordance with claim 15, wherein modeling sub-surface damage comprises:
determining a surface area of the sub-surface damage relative to the surface based on an analysis of locations from which the first and second acoustic signals were received across the testing area; and
determining a depth of the sub-surface damage relative to the surface based on an analysis of a frequency and an amplitude of the first and second acoustic signals.

17. The method in accordance with claim 16, wherein performing tapping impacts comprises:
using an accelerometer to determine a stiffness of the surface of the composite structure across the testing area; and
modeling the sub-surface damage based on an analysis of the stiffness of the surface at different positions and correlating the stiffness data with position data to identify a boundary of sub-surface damage.

18. The method in accordance with claim 17, wherein coupling an automated tap tester device comprises coupling the automated tap tester device to the surface using a vehicle that is automated, and wherein coupling the automated tap tester device comprises using a camera to align the automated tap tester device and the vehicle with the position of the sub-surface damage.

19. The method in accordance with claim 14, wherein coupling an automated tap tester device comprises coupling the automated tap tester device to the surface using a vehicle that is automated, and wherein coupling the automated tap tester device comprises using a camera to align the automated tap tester device and the vehicle with the position of the sub-surface damage.

20. The method in accordance with claim 14, wherein performing tapping impacts comprises:
using an accelerometer to determine a stiffness of the surface of the composite structure across the testing area; and
modeling the sub-surface damage based on an analysis of the stiffness of the surface at different positions and correlating the stiffness data with position data to identify a boundary of sub-surface damage.

\* \* \* \* \*